Jan. 19, 1937.  H. C. DOOSE  2,068,009
ARM REST
Filed Nov. 24, 1934
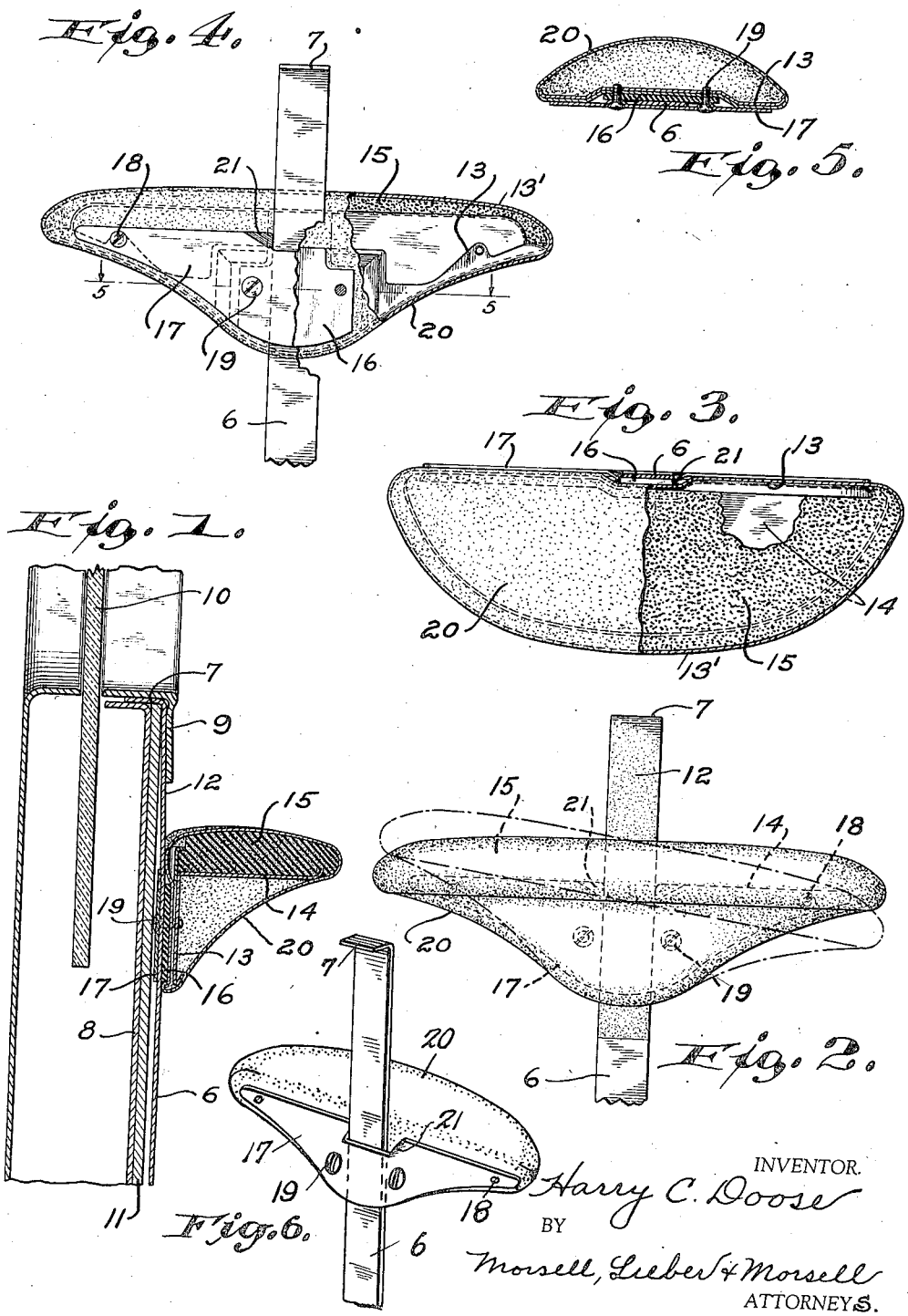
INVENTOR.
Harry C. Doose
BY
Morsell, Lieber & Morsell
ATTORNEYS.

Patented Jan. 19, 1937

2,068,009

UNITED STATES PATENT OFFICE 2,068,009

ARM REST

Harry C. Doose, Spokane, Wash.

Application November 24, 1934, Serial No. 754,564

9 Claims. (Cl. 155—198)

The present invention relates in general to improvements in devices for enhancing the comfort of the occupants of a seat, and relates more specifically to improvements in the construction and operation of arm rests which are attachable as accessories to the sides of the seats of automobiles or other vehicles which usually have windows adjacent the ends of the seats.

Generally defined, an object of the present invention is to provide an improved arm rest which is simple and compact in construction and which is, moreover, highly effective in use.

It has heretofore been proposed to provide various types of arm rests for the seats of automobiles. Some of these prior arm rests were permanently and fixedly mounted upon the side walls of the car enclosure adjacent to the ends of the seat and thus prevented adjustment of the height and inclination of the arm supports to meet the needs of the users, and also precluded complete removal of the arm rest in case additional seat width was required. These permanent or built-in arm rests, moreover, could not be applied as accessories to completed vehicles without marring the finish of the car and especially the upholstery. While a number of attempts have also been made to provide accessories of this type, which were attachable to any seat, these prior detachable arm rests were either too clumsy and awkward or did not permit sufficient flexibility in adjustment or tended to become loose and rattly after short durations of use, thus making all of the prior arm rests relatively objectionable and unpopular with the trade.

It is a more specific object of the present invention to provide an improved neat-appearing arm rest which may be applied to the seat of any standard automobile and which may be conveniently adjusted to meet the needs of the user.

Another specific object of the present invention is to provide an improved arm rest accessory wherein the arm support may be vertically adjusted or inclined relative to its carrier member, and which will remain in adjusted position until subsequent re-adjustment becomes desirable.

A further specific object of the present invention is to provide an improved arm-supporting member which is exceptionally comfortable and which will substantially match the normal finish of the vehicle to which it is applied.

Still another specific object of the present invention is to provide an arm rest which may be applied to either side of a seat and which can be manufactured and sold at moderate cost.

An additional object of the present invention is to provide an accessory which may be conveniently installed and manipulated, and which will present a highly finished and attractive appearance.

Another specific object of the invention is to provide an improved arm rest which is durable in construction and which may be readily removed when additional seat width is desired.

These and other objects and advantages will be apparent from the following detailed description.

A clear conception of an embodiment of the present invention and of the mode of constructing and of utilizing arm rests built in accordance therewith may be had by referring to the drawing accompanying and forming a part of this specification, in which like reference characters designate the same or similar parts in the various views.

Fig. 1 is a vertical section through one of the improved arm rests, showing the same applied to the side wall of an automobile adjacent to one of the side, sliding windows;

Fig. 2 is a front elevation of the arm rest, showing the arm-engaging member in horizontal position in full lines, and showing the same member in tilted position in dot-and-dash lines;

Fig. 3 is a top view of the arm rest, a portion of the covering material having been broken away in order to show internal structure;

Fig. 4 is a rear view of the arm rest, a portion of the structure having been broken away in order to show internal construction;

Fig. 5 is a horizontal section through the arm rest, taken along the line 5—5 of Fig. 4, and Fig. 6 is a rear perspective view of the arm rest.

While the invention has been shown and described herein as being specifically applied to an arm rest especially adapted for application to automobiles, it is not intended to unnecessarily limit the scope by such specific disclosure since some of the novel features may be more generally applicable to other types of arm rests.

Referring to the drawing, the improved arm rest comprises in general a substantially upright supporting bar 6; and an arm-engaging member of special construction which is both slidably and tiltably associated with the bar 6. As illustrated in Fig. 1, the bar 6 has an integral, upper end 7 which is bent at an angle to the bar proper, and this bar end 7 is formed for engagement with the top of the inner side wall 8 of a vehicle enclosure and may be engaged by the inner, detachable reveal 9 of the side window 10 so as to firmly but detachably retain the bar 6 substantially in engagement with the upholstery 11 at the side of a seat disposed within the vehicle. The normally exposed face 12 of the bar 6 may be coated with decorative surfacing material which provides a roughened surface for enhancing the friction, and the bar 6 may obviously be applied to either side of the seat.

The special arm-engaging member, which is carried by the bar 6, comprises a bracket consisting of a rear plate 13 and a tray 14 formed integral with the plate; a sponge rubber pad 15 cemented within the tray 14 and against an auxiliary plate 13′ secured to the plate 13 and having a laterally projecting upper flange; a friction block 16 interposed between the rear plate 13 and the bar 6; an outer, rear plate 17 detachably connected to the inner, rear plate 13 by means of screws 18, 19, the latter of which also serve to hold the block 16 in place; and a covering 20 of fabric normally concealing and coacting with the pad 15 and also concealing the bracket, and having its edges disposed between the bracket plate 13 and the friction block 16. The bracket, including the rear plate 13 and the tray 14, may be formed of sheet material, and the outer, rear plate 17 may also be formed of sheet material. The rubber block 16 coacts directly with the coated face 12 of the bar 6, and the outer, rear plate 17, which also engages the edges of and thereby holds the fabric covering 20 in place, directly engages the opposite face of the bar 6 and is clamped to the inner plate 13 by the screws 18, 19 sufficiently to produce considerable friction and clamping pressure against the opposite faces of the bar 6 in the locality of the rubber block 16. The upper portion of the outer, rear plate 17 has a cut-out, the side corners 21 of which are bent toward the bar 6 so as to provide side walls between which this bar is normally retained, but which are spaced slightly from the opposite edges of the bar so as to permit limited tilting of the arm-engaging member upon the bar 6. While the arm-engaging member may be vertically adjusted along the bar 6, it may also be tilted within the limits defined by the screws 19, as illustrated in Fig. 2, and this tilting may be in either direction. During such tilting, the corners 21 engage the opposite sides of the bar 6 as shown in Fig. 6, and the arm engaging member swings bodily about an axis disposed between the corners 21; and these corners are spaced apart sufficiently to permit the arm-engaging member to tilt within the limits defined by the screws 19. The outer fabric covering 20 may be formed of any suitable material corresponding to the normal upholstering of most standard cars, and the face 12 of the bar 6 may be coated with material having an effect similar to that of the upholstery.

In order to apply the improved arm rest to a car, it is only necessary to remove the reveal 9 and to subsequently apply the accessory as shown in Fig. 1. After the device has been thus installed, the arm-engaging member may be vertically adjusted to any desired position, and the coaction between the rubber block 16 and rear plate 17, and the bar 6, will frictionally hold the arm-engaging member in the desired position of adjustment. The arm-engaging member may, moreover, be tilted in either direction so as to enhance the comfort of the user, and by providing for such tilting in either direction, the accessory may be readily applied to the car at either end of the seat. The sponge rubber pad 15 provides considerable cushioning effect and additionally enhances the comfort of the user, and the arm-engaging member of the arm rest may, if desired, be entirely removed, without necessarily removing the bar 6, by withdrawing the seat and slipping the arm-engaging member off of the lower end of the bar 6.

From the foregoing description, it will be apparent that the present invention provides a simple, compact, and highly efficient arm rest accessory which may be conveniently applied to a car, or removed, at will. The resilient friction block 16 permits convenient adjustment of the arm-engaging member while insuring retention thereof in adjusted position, and the mounting afforded by the block 16 and by the outer retainer plate 17 also permits convenient tilting of the arm-engaging member. The improved arm rest has proven highly successful in actual commercial use, and obviously presents a neat and highly finished appearance. The assemblage can be manufactured with the aid of punches and dies at very moderate cost and is relatively unobstructive when in actual use.

It should be understood that it is not desired to limit the invention to the exact details of construction and to the precise mode of use herein shown and described, for various modifications within the scope of the claims may occur to persons skilled in the art.

It is claimed and desired to secure by Letters Patent:

1. An arm rest comprising, a supporting bar, a bracket having a tray provided with a recess near one side of said bar and also having an integral arm supporting portion extending away from said bar, a friction block interposed between said tray and said side of said bar within said recess, a clamping plate carried by said tray and coacting with the opposite side of said bar, and a cushion seated within said tray.

2. An arm rest comprising, a supporting bar, a bracket having a tray and being provided with a rear wall located near one side of said bar and an integral arm supporting portion extending away from said bar, a friction block interposed between said wall and said bar, a clamping plate carried by said tray wall and cooperating with the opposite side of said bar, said clamping plate having spaced integral projections spaced slightly from but engageable with the opposite edges of said bar to permit limited swinging of said bracket, and a cushion seated within said tray.

3. An arm rest comprising, a supporting bar, a bracket having a rear plate tiltably adjustable relative to said bar, a friction block interposed between said plate and one side of said bar, and a clamping plate carried by said bracket rear plate and coacting with the opposite side of said bar, said clamping plate having integral projections spaced slightly from the edges of said bar and extending toward said bracket, said projections being engageable with the opposite edges of said bar to provide alternate pivot points about which said bracket is tiltable.

4. An arm rest comprising, a flat elongated supporting bar, a sheet metal tray having a rear plate extending downwardly along said bar, a rubber friction block interposed between said plate and one side of said bar, a sheet metal clamping plate coacting with the opposite side of said bar, and fasteners spaced some distance from the opposite edges of said bar for securing said plates together, said clamping plate having integral projections remote from said fasteners and spaced slightly from said bar edges to provide alternate pivot points about which said tray is tiltable and said fasteners providing stops for limiting the tilting movement of said tray.

5. An arm rest comprising, a supporting bar, a tray having a depending portion extending along one side of said bar, a friction block interposed between said tray portion and said bar, a clamping plate coacting with the opposite side of said bar, fastening members spaced some distance from the opposite edges of said bar for holding said block in place and for securing the lower portion of said plate to the lower part of said depending tray portion, said plate having upper projections spaced slightly from said bar edges but engageable therewith to provide fulcrum points about which said tray is tiltable and said members being engageable with said bar edges to limit the tilting movement.

6. An arm rest comprising, a flat upright supporting bar, a one-piece tray having a rear plate extending along said bar and a top plate extending away from said bar and having an upstanding edge remote from said rear plate, an arm engaging cushion seated upon said top plate within said edge, a friction block interposed between said rear plate and one side of said bar, a clamping plate coacting with the opposite side of said bar, laterally spaced screws securing said clamping plate and said block to said rear plate and being spaced some distance from the opposite edges of said bar, and laterally spaced abutments carried by said clamping plate remote from said screws and located slight distances from the opposite edges of said bar, said abutments providing fulcrum points about which said tray is tiltable relative to said bar and said screws being engageable with said bar edges to limit the tilting movement.

7. An arm rest comprising a flat upright supporting bar, a bracket having a top arm supporting plate extending away from said bar and also having a rear plate located near one side of said bar and extending therealong, a friction block interposed between said rear plate and one side of said bar, and a clamping plate carried by said rear bracket wall and coacting with the opposite side of said bar, said clamping plate having integral projections spaced slightly from the opposite edges of said bar and extending toward said rear bracket wall, said projections being engageable with the opposite side edges of said bar to provide alternate pivot points about which said bracket is tiltable.

8. An arm rest comprising, a flat upright supporting bar, a bracket having a tray extending away from said bar and also having a rear plate located near the front flat side of said bar and extending therealong, a friction block interposed between said rear plate and the front flat side of said bar, a resilient clamping plate carried by said rear bracket plate and coacting with the rear flat side of said bar, said clamping plate having integral projections disposed adjacent the opposite edges of said bar and spaced slightly therefrom, said projections extending forwardly from said clamping plate and being engageable with the opposite side edges of said bar to provide alternate pivot points about which said bracket is tiltable, and a cushion seated within said tray.

9. An arm rest comprising, a flat supporting bar, a bracket having an arm supporting plate extending away from said bar and also having a rear plate extending along one side of said bar, a friction block interposed between said rear plate and one side of said bar, and a clamping plate secured to said rear plate and coacting with the opposite side of said bar, said clamping plate having integral projections disposed adjacent the opposite edges of said bar and spaced slightly therefrom, said projections being engageable with the opposite side edges of said bar to permit limited swinging of said bracket.

HARRY C. DOOSE.